(No Model.)
P. W. CHRISTENSEN.
HANGER FOR FRAMES, SIGNS, &c.
No. 601,553. Patented Mar. 29, 1898.
*Fig. I.*
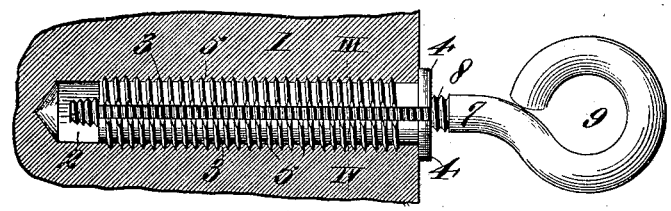
*Fig. II.*
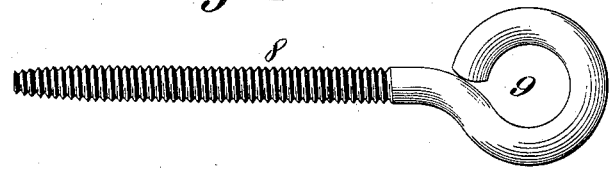
*Fig. III.*     *Fig. IV.*
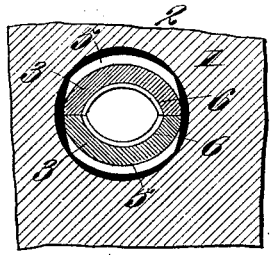 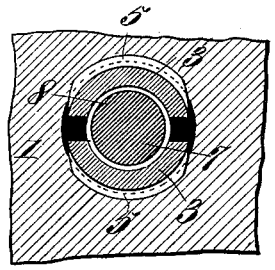
*Fig. V.*
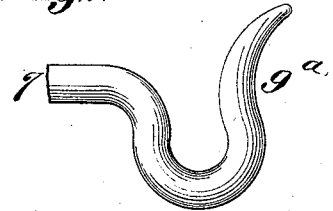
Attest:
E. S. Knight
Stanley Stoner
Inventor:
Peter W. Christensen
By Knight Bros.
Atty's

UNITED STATES PATENT OFFICE.

PETER W. CHRISTENSEN, OF ST. LOUIS, MISSOURI.

HANGER FOR FRAMES, SIGNS, &c.

SPECIFICATION forming part of Letters Patent No. 601,553, dated March 29, 1898.

Application filed February 20, 1897. Serial No. 624,404. (No model.)

*To all whom it may concern:*

Be it known that I, PETER W. CHRISTENSEN, a citizen of the United States, residing at the city of St. Louis, in the State of Missouri, have invented a certain new and useful Improvement in Hangers for Frames, Signs, &c., of which the following is a full, clear, and exact description, reference being had to the accompanying drawings, forming a part of this specification.

My invention relates to a hanger designed to be embedded in walls of a hard nature, such as stone or brick, that will not readily receive the insertion of nails or screws to serve as means to suspend articles upon.

My invention consists in features of novelty hereinafter fully described and claimed.

Figure I illustrates a fragment of a wall and shows one of my hangers embedded therein. Fig. II is a view of one of the hanger-screws. Figs. III and IV illustrate an enlarged cross-section taken on line III IV, Fig. I, Fig. III showing the elliptical split sleeve inserted previous to the application of the hanger-screw, and Fig. IV showing the hanger-screw inserted in the sleeve. Fig. V shows a modified form of the outer end of the hanger-screw.

In the drawings, 1 designates a fragment of wall provided with a bore 2, that may be produced by means of a drill or other suitable implement.

3 designates two segmental members of a split sleeve, each member being formed with a segmental flange 4 at its outer end, with an exterior segmental screw-thread 5, and with an interior screw-thread 6, the two members providing an elliptical socket between them.

7 designates a screw provided with a threaded portion 8, the threads of which correspond to the threads 6 on the interior of the sleeve members. The outer end of the screw 7 is formed into an eye 9 and the inner end is tapered to adapt the screw to more readily enter the sleeve on its insertion.

In Fig. V, I have shown a modified form of the hanger-screw, in which a hook $9^a$ is employed instead of the eye 9.

In applying the hanger the bore 2 is first formed. Then the members 3 of the split sleeve are inserted in the bore until their flanges 4 abut against the wall and thereby prevent their further insertion. The screw 7 is next introduced into the sleeve and turned therein, in which act the sleeve members are spread apart and the exterior segmental screw-thread 5 is caused to be embedded in the material surrounding the bore, whereby the sleeve is firmly held to its seat. The hanger is then complete and any article to be suspended may be connected to the eye or hook 9 or $9^a$ by any suitable means.

I have shown and described the split sleeve of two members; but it is quite evident that three or more members might be employed and the same results attained without departing from my invention.

I claim as my invention—

As a new article of manufacture, a hanger comprising an elliptical split sleeve having segmental members 3 which are each formed with a segmental flange 4 at its outer end, with an exterior segmental screw-thread 5, and with an interior segmental screw-thread 6, and providing between them an elliptical socket, and a hanger-screw formed with a thread fitting the interior screw-thread when the members of the split sleeve are expanded; substantially as described.

PETER W. CHRISTENSEN.

In presence of—
E. S. KNIGHT,
N. FINLEY.